(12) United States Patent
Kishiyama et al.

(10) Patent No.: US 8,630,366 B2
(45) Date of Patent: Jan. 14, 2014

(54) MOBILE STATION

(75) Inventors: Yoshihisa Kishiyama, Yokosuka (JP); Motohiro Tanno, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 150 days.

(21) Appl. No.: 13/120,337

(22) PCT Filed: Sep. 18, 2009

(86) PCT No.: PCT/JP2009/066346
§ 371 (c)(1), (2), (4) Date: May 24, 2011

(87) PCT Pub. No.: WO2010/032815
PCT Pub. Date: Mar. 25, 2010

(65) Prior Publication Data
US 2011/0216850 A1    Sep. 8, 2011

(30) Foreign Application Priority Data

Sep. 22, 2008 (JP) ............... P2008-242909

(51) Int. Cl.
*H04L 27/04* (2006.01)
(52) U.S. Cl.
USPC ............... 375/295; 370/280; 455/509
(58) Field of Classification Search
USPC ............... 375/295; 370/280; 455/509
See application file for complete search history.

(56) References Cited

U.S. PATENT DOCUMENTS

| 5,539,730 A * | 7/1996 | Dent ............... 370/280 |
| 2009/0232194 A1 | 9/2009 | Yoshida |
| 2011/0207493 A1* | 8/2011 | Taoka et al. ............... 455/509 |

FOREIGN PATENT DOCUMENTS

| EP | 1865618 A1 | 12/2007 |
| WO | 2007/029406 A1 | 3/2007 |
| WO | 2008/057969 A2 | 5/2008 |

OTHER PUBLICATIONS

Extended European Search Report for European Application No. 09814659.0 dated Apr. 11, 2012 (9 pages).
Office Action for Japanese Patent Application No. 2008-2424909 mailed May 8, 2012, with English translation thereof (6 pages).
3GPP TSG-RAN WG1 Meeting #54, R1-082807, "CM Analysis of UL Transmission for LTE-A"; Jeju, Korea, Aug. 18-22, 2008 (8 pages).
International Search Report w/translation from PCT/JP2009/066346 dated Oct. 27, 2009 (4 pages).
Written Opinion from PCT/JP2009/066346 dated Oct. 27, 2009 (4 pages).
3GPP TSG RAN WG1 Meeting #54, R1-083016; "Views on UL Hybrid Radio Access Scheme in LTE-Advanced"; NTT DOCOMO, Inc.; Jeju, Korea; Aug. 18-22, 2008 (7 pages).
3GPP TSG RAN WG1 Meeting #53bis, R1-082398; "Consideration on Multicarrier Transmission Scheme for LTE-Adv Uplink"; Panasonic; Warsaw, Poland; Jun. 30-Jul. 4, 208 (3 pages).

(Continued)

*Primary Examiner* — Eva Puente
(74) *Attorney, Agent, or Firm* — Osha Liang LLP (57) ABSTRACT

A mobile station configured to perform MIMO communication is disclosed, where the mobile station includes a control unit configured to determine a radio access scheme to be applied, based on at least one of a transmission frequency bandwidth to be used and a transmission stream number used in the MIMO communication.

3 Claims, 9 Drawing Sheets

(56) References Cited

OTHER PUBLICATIONS

3GPP TSG RAN WG1 Meeting #54, R1-082787; "Uplink Multiple Access Scheme for LTE-Advanced"; Sharp; Jeju Island, Korea; Aug. 18-22, 2008 (4 pages).

3GPP TSG RAN1#54, R1-083012; "Uplink Access Scheme for LTE-Advanced in BW>20MHz"; NEC Group; Jeju, Korea; Aug. 18-22, 2008 (12 pages).

3GPP TSG RAN1#54, R1-083011; "Uplink Access Scheme for LTE-Advanced in BE=<20MHz"; NEC Group; Jeju, Korea; Aug. 18-22, 2008 (16 pages).

3GPP TSG RAN IMT Advanced Workshop, REB-080026; "Proposals for LTE-Advanced Technologies"; NTT DOCOMO, Inc.; Shenzhen, China; Apr. 7-8, 2008 (18 pages).

R. Kudo et al.; "Fukusu Sub-carrier no Sokan Gyoretsu o Mochiita Kotaiiki MIMO-OFDM-yo Shikosei Seigyoho" (translated as "Downlink Beamforming Method Using Broadband Channel State Information for MIMO-OFDM Systems"); IEICE Technical Report, vol. 104; pp. 59-64 with English translation; Oct. 2004 (19 pages).

Office Action for Chinese Application No. 200980136950.4 dated Apr. 3, 2013, with English translation thereof (9 pages).

\* cited by examiner

|  | BANDWIDTH OF 20 MHz OR LESS | BANDWIDTH OF WIDER THAN 20 MHz |
|---|---|---|
| 1 STREAM | Clustered DFT-Spread OFDM | Clustered DFT-Spread OFDM |
| 2 STREAMS OR MORE | OFDM | OFDM |

FIG. 6

|  | BANDWIDTH OF 20 MHz OR LESS | BANDWIDTH OF WIDER THAN 20 MHz |
|---|---|---|
| 1 STREAM | Clustered DFT-Spread OFDM | Clustered DFT-Spread OFDM |
| 2 STREAMS OR MORE | Clustered DFT-Spread OFDM | OFDM |

FIG. 7

|  | BANDWIDTH OF 20 MHz OR LESS | BANDWIDTH OF WIDER THAN 20 MHz |
|---|---|---|
| 1 STREAM | DFT-Spread OFDM | OFDM |
| 2 STREAMS OR MORE | OFDM | OFDM |

FIG. 8

|  | BANDWIDTH OF 20 MHz OR LESS | BANDWIDTH OF WIDER THAN 20 MHz |
|---|---|---|
| 1 STREAM | Clustered DFT-Spread OFDM | Clustered DFT-Spread OFDM |
| 2 STREAMS OR MORE | Clustered DFT-Spread OFDM (or) OFDM | OFDM |

FIG. 9

| # | BANDWIDTH | TRANSMISSION ANTENNA NUMBER | SUPPORTABLE RADIO ACCESS SCHEME |
|---|---|---|---|
| 1 | 20 MHz OR LESS | 1 | Clustered DFT-Spread OFDM only |
| 2 | WIDER THAN 20 MHz | 1 | |
| 3a | 20 MHz OR LESS | $\geq 2$ | |
| 3b | 20 MHz OR LESS | $\geq 2$ | Clustered DFT-Spread OFDM and OFDM |
| 4 | WIDER THAN 20 MHz | $\geq 2$ | |

MOBILE STATION

TECHNICAL FIELD

The present invention relates to a mobile station configured to perform the MIMO (Multiple Input Multiple Output) communication.

BACKGROUND

In a mobile communication system of the LTE (Release 8) scheme, a single carrier transmission scheme (DFT-Spread OFDM scheme, i.e., (SC)-FDMA scheme) is adopted in order to attach importance to the compensation of a reduced coverage, which occurs as a result of a decrease in PAPR (Peak-to-Average Power Ratio).

On the other hand, presently, in a mobile communication system of the "LTE-Advanced" scheme that is being standardized in the 3GPP, the introduction of a Multicarrier transmission scheme is considered.

However, in the current mobile communication system of the LTE-Advanced scheme, it is not studied yet as to how the existing Multicarrier transmission and the single carrier transmission are combined and used to provide the most appropriate communication in a viewpoint of improvement of a transmission characteristic and flexibility of a radio resource assignment.

Therefore, the present invention is intended to overcome the above-described problem. An object of the present invention is to provide a mobile station capable of providing the most appropriate communication in a viewpoint of improvement in a transmission characteristic and flexibility of a radio resource assignment by combining a Multicarrier transmission and a single carrier transmission.

SUMMARY

A first aspect of the present invention is summarized as a mobile station configured to perform a MIMO communication, including: a control unit configured to determine a radio access scheme to be applied, based on at least one of a transmission frequency bandwidth to be used and a transmission stream number used in the MIMO communication.

In the first aspect of the present invention, the control unit can be configured to determine a configuration of a reference signal to be transmitted, based on the radio access scheme to be applied.

In the first aspect of the present invention, the control unit can be configured to select the radio access scheme to be applied, out of at least two of OFDM schemes, a Clustered DFT-Spread OFDM scheme, a Multicarrier DFT-S-OFDM scheme, and a DFT-Spread OFDM scheme.

In the first aspect of the present invention, the control unit can be configured to determine a precoding vector to be used, in cluster units, when the Clustered DFT-Spread OFDM scheme is selected as the radio access scheme to be applied.

In the first aspect of the present invention, the control unit can be configured to determine a precoding vector to be used, in DFT units, when the Multicarrier DFT-S-OFDM scheme is selected as the radio access scheme to be applied.

As explained above, according to the present invention, it is possible to provide a mobile station capable of providing the most appropriate communication in a viewpoint of improvement in a transmission characteristic and flexibility of a radio resource assignment by combining a Multicarrier transmission and a single carrier transmission.

BRIEF DESCRIPTION OF THE DRAWINGS

FIGS. 10(*a*) and 10(*b*) are diagrams showing examples of a method of transmitting a pilot signal in the mobile station in accordance with one or more embodiments of the present invention.

FIGS. 11(*a*) and 11(*b*) are diagrams showing examples of a method of transmitting a pilot signal in the mobile station in accordance with one or more embodiments of the present invention.

FIGS. 15(*a*) and 15(*b*) are diagrams explaining the effect of the mobile station in accordance with one or more embodiments of the present invention.

DETAILED DESCRIPTION (Configuration of Mobile Station According to First Embodiment of the Present Invention)

The configuration of a mobile station UE according to a first embodiment of the present invention is described with reference to FIG. 1 to FIG. 13. The mobile station UE according to this embodiment can be used in a mobile communication system of the LTE-Advanced scheme, and is configured to be able to perform the MIMO communication.

Figure 1:
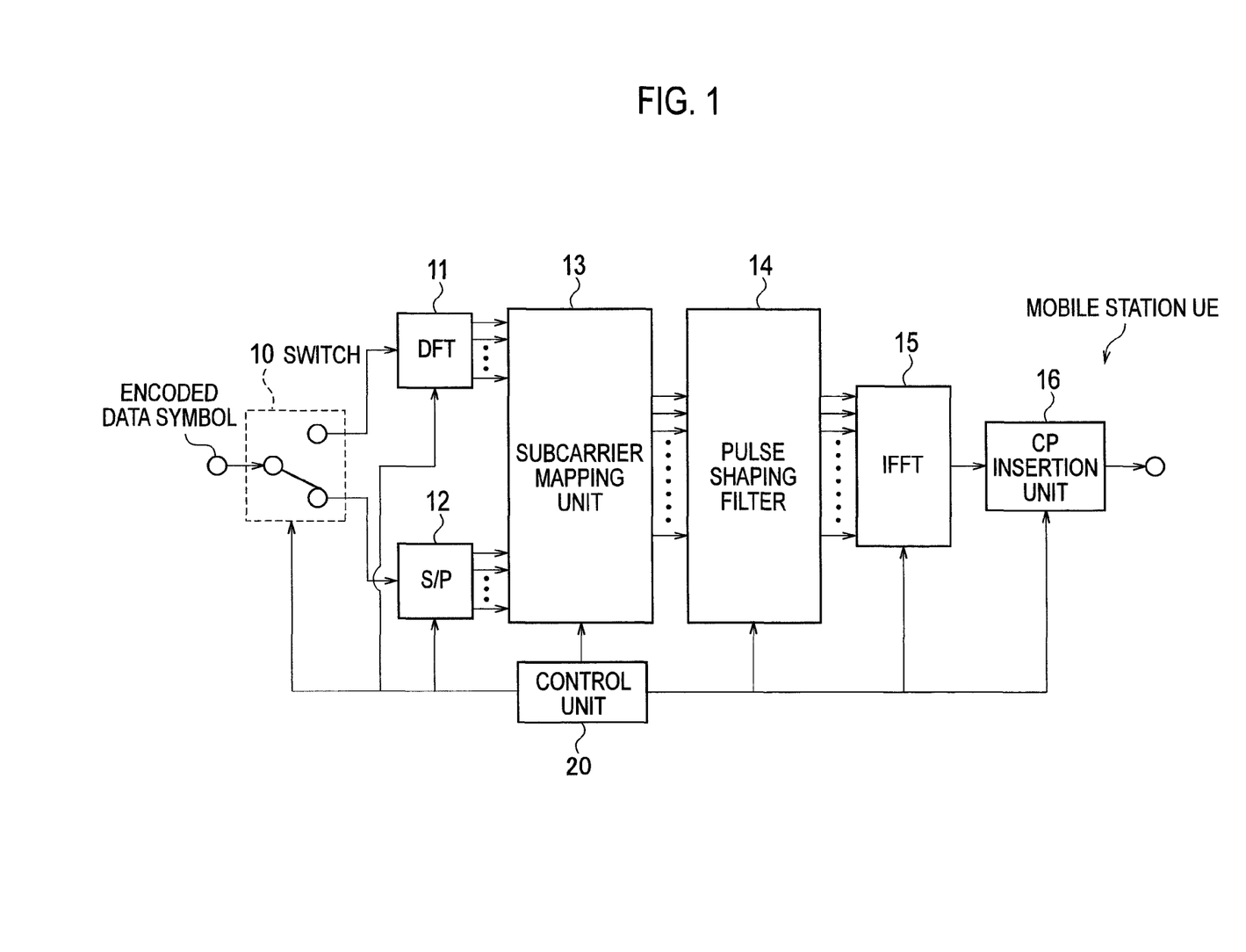
FIG. 1 is a functional block diagram of a mobile station according to a first embodiment of the present invention.

As illustrated in FIG. 1, the mobile station UE according to this embodiment includes: a switch 10; a DFT (Discrete Fourier Transform) 11; an S/P (Serial-to-Parallel Converter) 12; a subcarrier mapping unit 13; a pulse shaping filter 14; an IFFT (Inversed Fast Fourier Transform) 15; a CP (Cyclic Prefix) insertion unit 16; and a control unit 20.

In the mobile station UE according to this embodiment, a system for a single carrier transmission scheme (i.e., a DFT-Spread OFDM scheme) is configured by the DFT 11, the subcarrier mapping unit 13, the pulse shaping filter 14, and the IFFT 15.

On the other hand, in the mobile station UE according to this embodiment, a system for a Multicarrier transmission scheme is configured by the S/P 12, the subcarrier mapping unit 13, the pulse shaping filter 14, and the IFFT 15.

Figure 2:
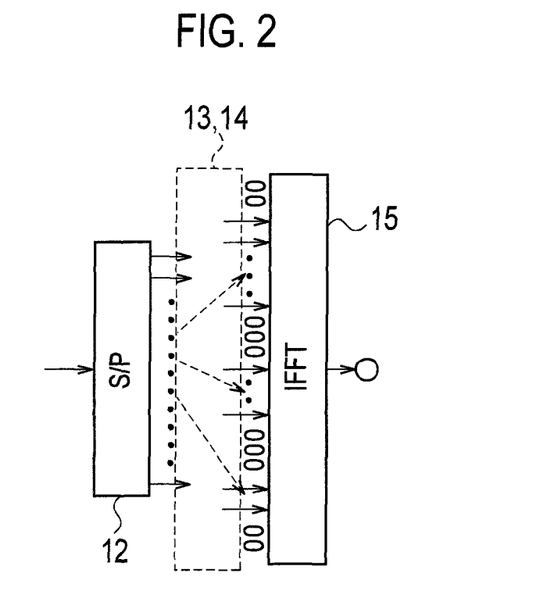
FIG. 2 is a diagram showing one example of a function of performing a Multicarrier transmission in a functional block of the mobile station according to the first embodiment of the present invention.
Figure 3:
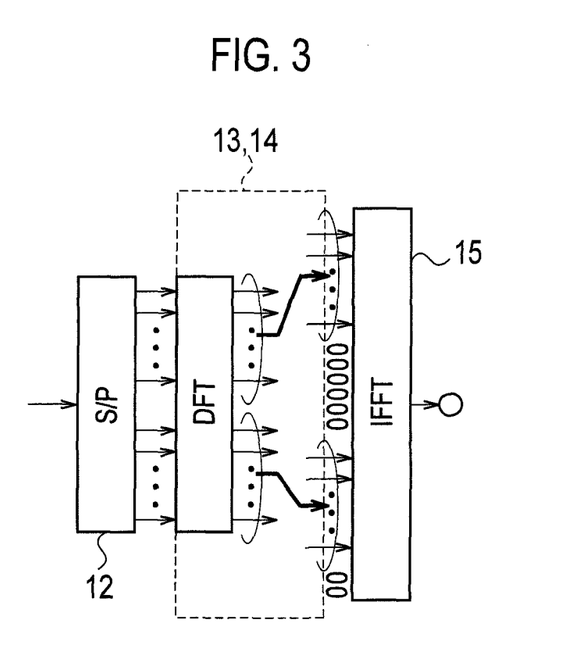
FIG. 3 is a diagram showing one example of a function of performing the Multicarrier transmission in a functional block of the mobile station according to the first embodiment of the present invention.
Figure 4:
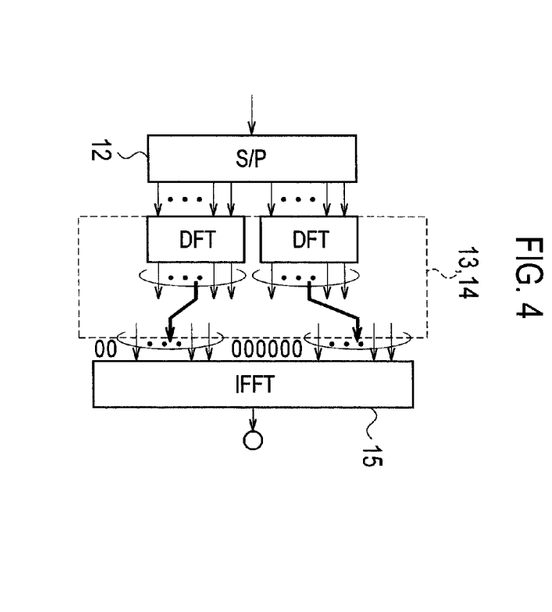
FIG. 4 is a diagram showing one example of a function of performing the Multicarrier transmission in a functional block of the mobile station according to the first embodiment of the present invention.

In this case, the system for the Multicarrier transmission scheme may adopt a system for the OFDM scheme as illustrated in FIG. 2, a system for a Clustered DFT-Spread OFDM scheme as illustrated in FIG. 3, and a system for a Multicarrier DFT-S-OFDM scheme as illustrated in FIG. 4.

The switch 10 is configured to switch to which of systems, i.e., the system for the single carrier transmission scheme and the system for the multicarrier transmission scheme, encoded data symbol is input, according to a switch command from the control unit 20.

Although the subcarrier mapping unit 13 can map on continuous subcarriers only in the system for the single carrier transmission scheme, the subcarrier mapping unit 13 can also map on discontinuous subcarriers in the system for the multicarrier transmission scheme.

The control unit 20 is configured to control the function of the mobile station UE as illustrated in FIG. 1. In this case, the control unit 20 is configured to determine the radio access scheme to be applied, based on at least one of the transmission frequency bandwidth to be used and the transmission stream number used in the MIMO communication, and to transmit a switch command to the switch 10, based on the determination.

Figure 5:
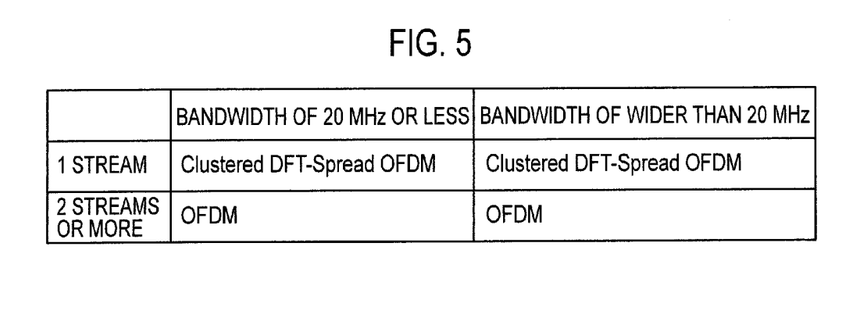
FIG. 5 is a diagram showing one example in which a radio access scheme applied in the mobile station according to the first embodiment of the present invention is combined.

For example, the control unit 20 may determine the radio access scheme to be applied by a combination of the "transmission frequency bandwidth to be used" and the "transmission stream number used in the MIMO communication" illustrated in FIG. 5.

In such a case, the control unit 20 selects, as the radio access scheme to be applied, a Clustered DFT-Spread OFDM scheme, when the "transmission frequency bandwidth to be used" is "equal to or less than 20 MHz" and the "transmission stream number used in the MIMO communication" is "1".

Moreover, the control unit 20 selects, as the radio access scheme to be applied, a Clustered DFT-Spread OFDM scheme, when the "transmission frequency bandwidth to be used" is "wider than 20 MHz" and the "transmission stream number used in the MIMO communication" is "1".

Further, the control unit 20 selects, as the radio access scheme to be applied, an OFDM scheme, when the "transmission frequency bandwidth to be used" is "equal to or less than 20 MHz" and the "transmission stream number used in the MIMO communication" is "equal to or more than 2".

Moreover, the control unit 20 selects, as the radio access scheme to be applied, the OFDM scheme, when the "transmission frequency bandwidth to be used" is "wider than 20 MHz" and the "transmission stream number used in the MIMO communication" is "equal to or more than 2".

That is, according to the combinations illustrated in FIG. 5, irrespective of the transmission frequency bandwidth to be used, the control unit 20 may determine the radio access scheme to be applied based on the transmission stream number used in the MIMO communication.

As a result, the mobile station UE provided only with a single transmission antenna suffices to support a "Clustered Function" (i.e., does not need to support an OFDM scheme), in addition to the capability that has been required in the LTE (Release 8) scheme.

Figure 6:
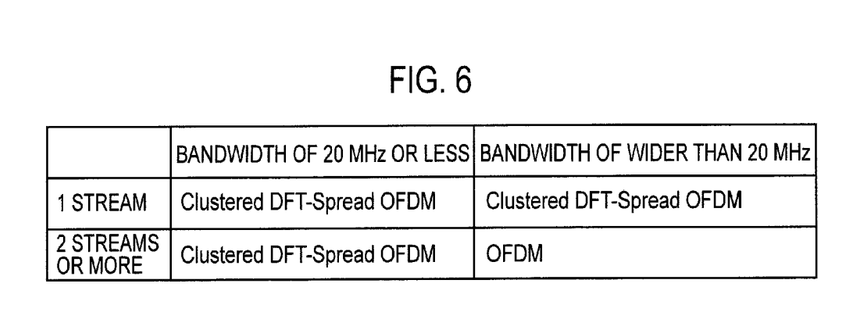
FIG. 6 is a diagram showing one example in which the radio access scheme applied in the mobile station according to the first embodiment of the present invention is combined.

Moreover, the control unit 20 may determine the radio access scheme to be applied by a combination of the "transmission frequency bandwidth to be used" and the "transmission stream number used in the MIMO communication" illustrated in FIG. 6.

In such a case, the control unit 20 selects, as the radio access scheme to be applied, the Clustered DFT-Spread OFDM scheme, when the "transmission frequency bandwidth to be used" is "equal to or less than 20 MHz" and the "transmission stream number used in the MIMO communication" is "1".

Moreover, the control unit 20 selects, as the radio access scheme to be applied, the Clustered DFT-Spread OFDM scheme, when the "transmission frequency bandwidth to be used" is "wider than 20 MHz" and the "transmission stream number used in the MIMO communication" is "1".

Further, the control unit 20 selects, as the radio access scheme to be applied, the Clustered DFT-Spread OFDM scheme, when the "transmission frequency bandwidth to be used" is "equal to or less than 20 MHz" and the "transmission stream number used in the MIMO communication" is "equal to or more than 2".

Moreover, the control unit 20 selects, as the radio access scheme to be applied, the OFDM scheme, when the "transmission frequency bandwidth to be used" is "wider than 20 MHz" and the "transmission stream number used in the MIMO communication" is "equal to or more than 2".

As a result, most of the mobile stations UE suffice to support the "Clustered Function" (i.e., do not need to support the OFDM scheme) and to posses the capability that has been required in the LTE (Release 8) scheme.

Figure 7:
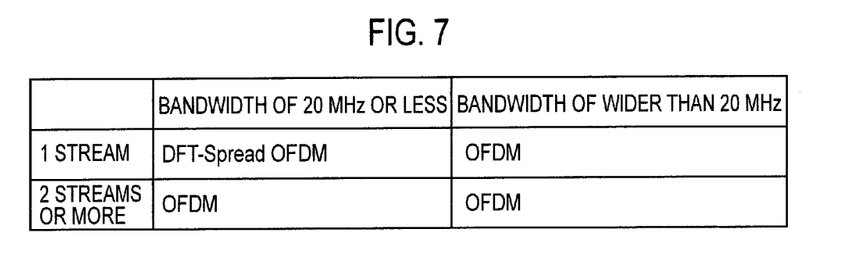
FIG. 7 is a diagram showing one example in which the radio access scheme applied in the mobile station according to the first embodiment of the present invention is combined.

For example, the control unit 20 may determine the radio access scheme to be applied by a combination of the "transmission frequency bandwidth to be used" and the "transmission stream number used in the MIMO communication" illustrated in FIG. 7.

In such a case, the control unit 20 selects, as the radio access scheme to be applied, the DFT-Spread OFDM scheme, when the "transmission frequency bandwidth to be used" is "equal to or less than 20 MHz" and the "transmission stream number used in the MIMO communication" is "1".

Moreover, the control unit 20 selects, as the radio access scheme to be applied, the OFDM scheme, when the "transmission frequency bandwidth to be used" is "wider than 20 MHz" and the "transmission stream number used in the MIMO communication" is "1".

Further, the control unit 20 selects, as the radio access scheme to be applied, the OFDM scheme, when the "transmission frequency bandwidth to be used" is "equal to or less than 20 MHz" and the "transmission stream number used in the MIMO communication" is "equal to or more than 2".

Moreover, the control unit 20 selects, as the radio access scheme to be applied, the OFDM scheme, when the "transmission frequency bandwidth to be used" is "wider than 20 MHz" and the "transmission stream number used in the MIMO communication" is "equal to or more than 2".

As a result, the communications not supported by the mobile communication system of the LTE (Release 8) scheme can be all supported by the OFDM scheme.

Figure 8:
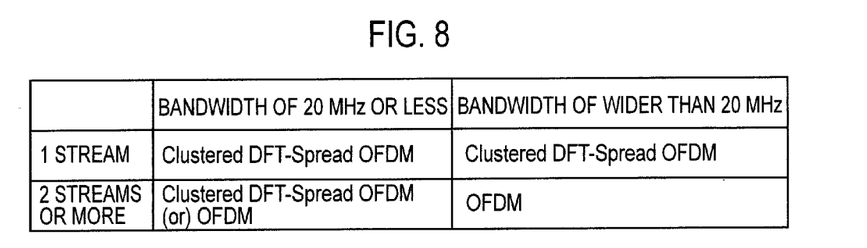
FIG. 8 is a diagram showing one example in which the radio access scheme applied in the mobile station according to the first embodiment of the present invention is combined.

For example, the control unit 20 may determine the radio access scheme to be applied by a combination of the "transmission frequency bandwidth to be used" and the "transmission stream number used in the MIMO communication" illustrated in FIG. 8.

In such a case, the control unit 20 selects, as the radio access scheme to be applied, the Clustered DFT-Spread OFDM scheme, when the "transmission frequency bandwidth to be used" is "equal to or less than 20 MHz" and the "transmission stream number used in the MIMO communication" is "1".

Moreover, the control unit 20 selects, as the radio access scheme to be applied, the Clustered DFT-Spread OFDM scheme, when the "transmission frequency bandwidth to be used" is "wider than 20 MHz" and the "transmission stream number used in the MIMO communication" is "1".

Further, the control unit 20 selects, as the radio access scheme to be applied, the Clustered DFT-Spread OFDM scheme or the OFDM scheme, when the "transmission frequency bandwidth to be used" is "equal to or less than 20 MHz" and the "transmission stream number used in the MIMO communication" is "equal to or more than 2".

Moreover, the control unit 20 selects, as the radio access scheme to be applied, the OFDM scheme, when the "transmission frequency bandwidth to be used" is "wider than 20 MHz" and the "transmission stream number used in the MIMO communication" is "equal to or more than 2".

Figure 9:
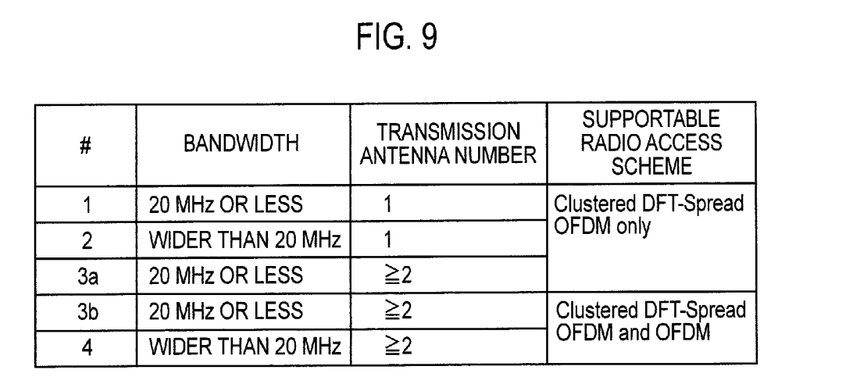
FIG. 9 is a diagram showing one example of a category of the mobile station according to the first embodiment of the present invention.
Figure 10:
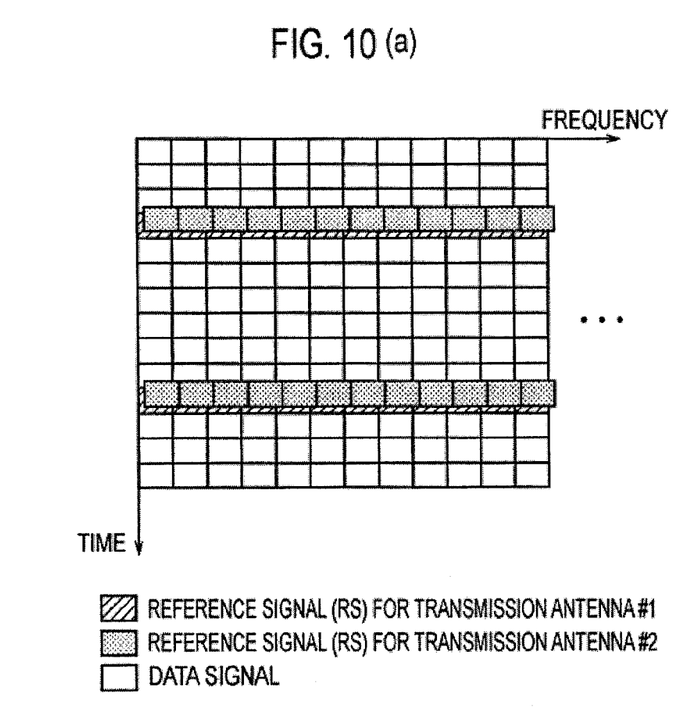
Figure 11:
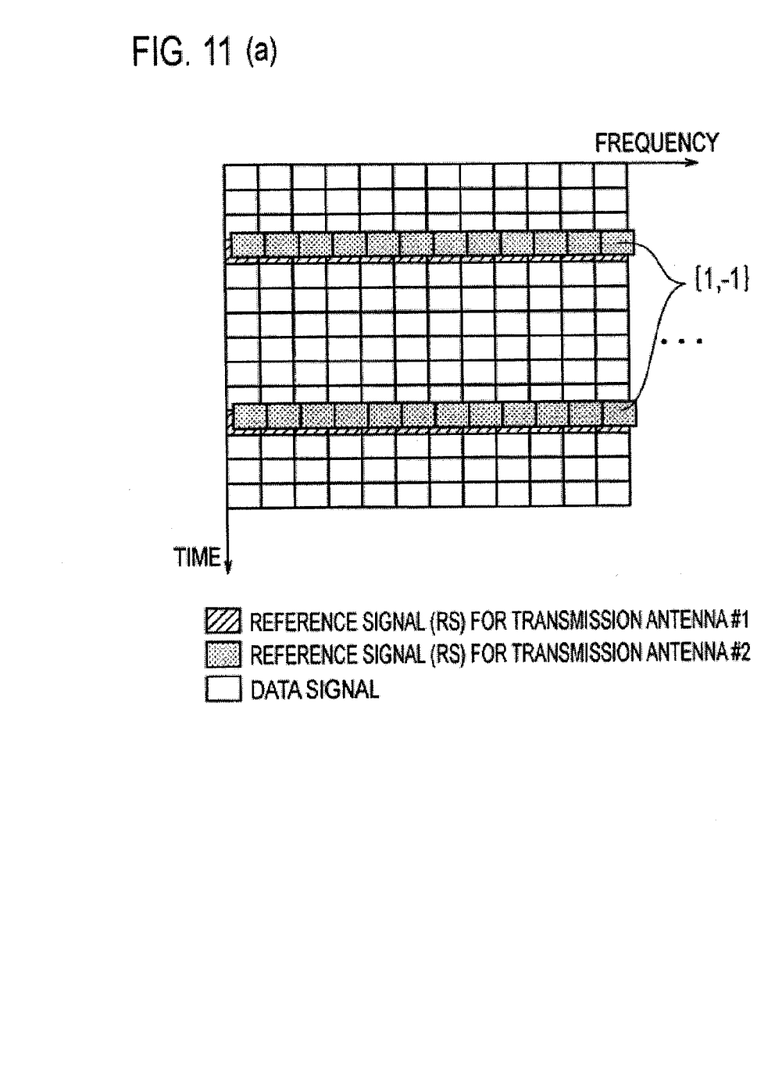

A category of the mobile station UE in which the combinations illustrated in FIG. 8 are applied is shown in FIG. 9. According to FIG. 9, it is understood that the mobile station UE provided only with a single transmission antenna suffices to support the Clustered DFT-Spread OFDM scheme only.

The control unit 20 may be configured to determine the configuration of a reference signal to be transmitted, based on the radio access scheme to be applied.

For example, the control unit 20 may determine to perform orthogonal multiplexing in which Cyclic Shift (phase rotation of a frequency area) of a different CAZAC sequence is applied to a reference signal for a transmission antenna #1 and a reference signal for a transmission antenna #2, when the DFT-Spread OFDM scheme is applied, as illustrated in FIG. 10(a).

On the other hand, the control unit 20 may determine to perform orthogonal multiplexing in which the reference signal for a transmission antenna #1 and the reference signal for a transmission antenna #2 are mapped to a different subcarrier position, when the OFDM scheme is applied, as illustrated in FIG. 10(b).

The control unit 20 may determine to perform multiplexing (multiplexing performed by changing signs {1, 1}, {1, −1} between two symbols) by an inter-symbol orthogonal sequence, on the reference signal for a transmission antenna #1 and the reference signal for a transmission antenna #2, as illustrated in FIG. 11(a).

The control unit 20 may determine to multiplex reference signals for the transmission antennas #1 to #4 by a combination of mapping to a subcarrier position different from the Cyclic Shift of the different CAZAC sequence and the inter-symbol orthogonal sequence, as illustrated in FIG. 11(b).

Figure 12:
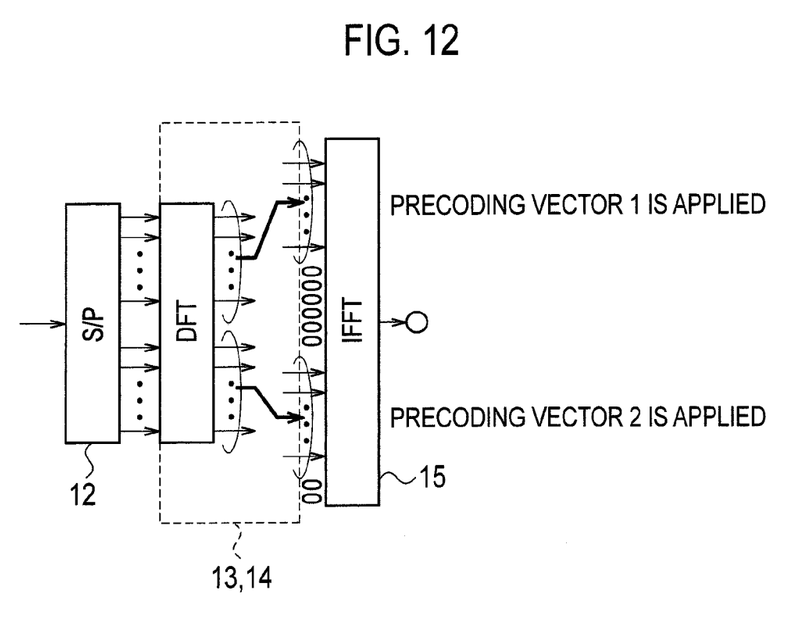
FIG. 12 is a diagram showing one example of a precoding method used in the mobile station according to the first embodiment of the present invention.

The control unit 20 may be configured to determine a precoding vector to be used, in cluster units, as illustrated in FIG. 12, when the Clustered DFT-Spread OFDM scheme is selected as the radio access scheme to be applied.

As a result, it is possible to prevent an unnecessary deterioration of PAPR for each cluster by a frequency selectivity precoding.

Figure 13:
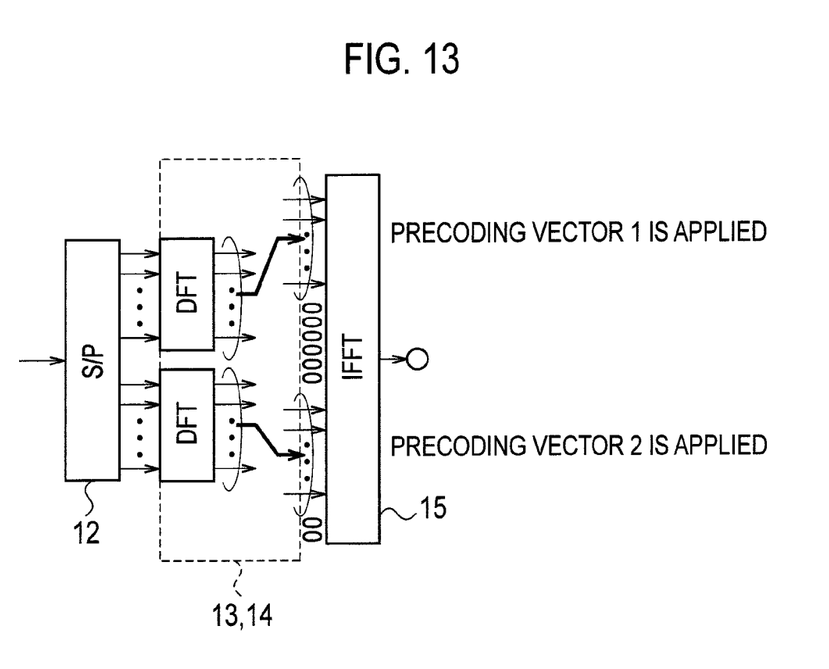
FIG. 13 is a diagram showing one example of a precoding method used in the mobile station according to the first embodiment of the present invention.

The control unit 20 may be configured to determine the precoding vector to be used, in DFT units, as illustrated in FIG. 13, when the Multicarrier DFT-S-OFDM scheme is selected as the radio access scheme to be applied.

As a result, it is possible to prevent an unnecessary deterioration of PAPR for each DFT by a frequency selectivity precoding.

(Operation and Effect of the Mobile Station According to the First Embodiment of the Present Invention)

According to the embodiment-based mobile station UE, when the OFDM scheme, the Clustered DFT-Spread OFDM scheme, or the Multicarrier DFT-S-OFDM scheme is applied, it is possible to realize the assignment of discontinuous radio resources (for example, A1 and A2).

Figure 14:
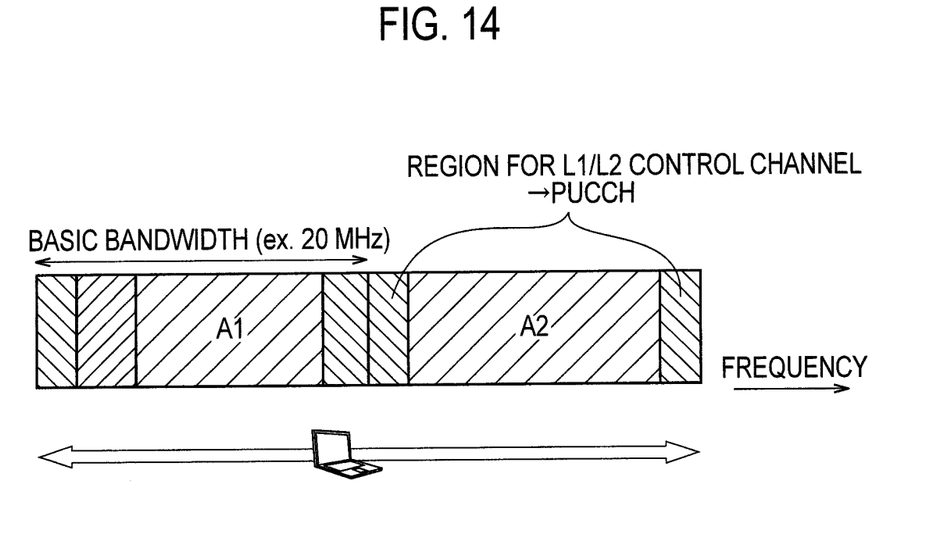
FIG. 14 is a diagram explaining the effect of the mobile station according to the first embodiment of the present invention.

In particular, as illustrated in FIG. 14, when a radio resource for PUCCH (Physical Uplink Control Channel) is assigned within the transmission frequency bandwidth to be used, the operation and effect are very effective.

According to the embodiment-based mobile station UE, when the OFDM scheme is applied, it is possible to improve a throughput characteristic in the MIMO communication by an excellent durability against the multi-pulse interference of the OFDM scheme.

According to the embodiment-based mobile station UE, when the OFDM scheme is applied, it is possible to realize a particular improvement by a highly accurate signal separation, resulting from the affinity for an MLD (Maximum Likelyhood Detection) reception of the OFDM scheme.

Figure 15:
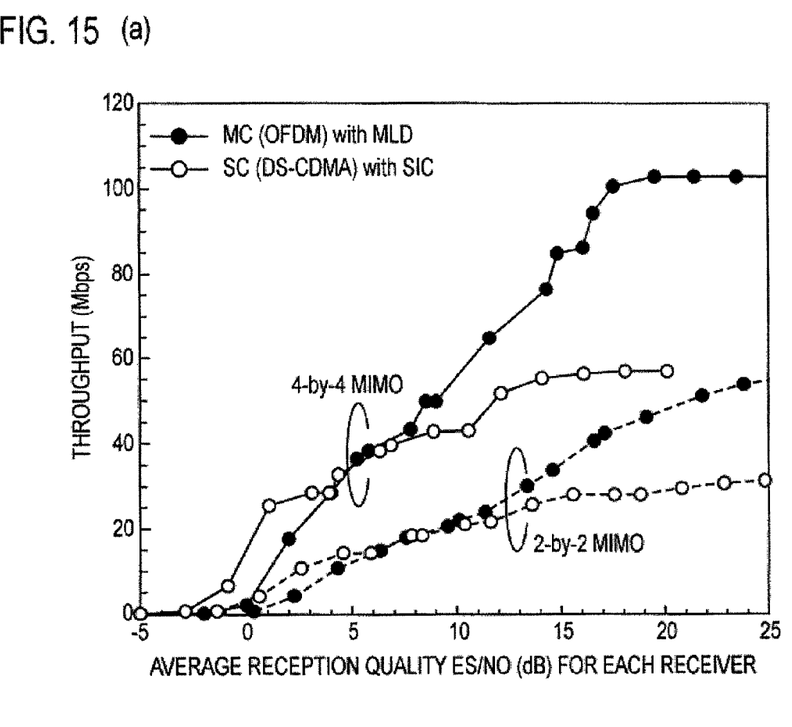

FIG. 15(a) and FIG. 15(b) show experiment results obtained by comparing a throughput when an OFDM scheme (multicast transmission scheme) using MLD is used with a throughput when a DS-CDMA system (single cast transmission scheme) using SIC is used in a 4-by-4 MIMO communication and a 2-by-2 MIMO communication.

As understood from FIG. 15(a) and FIG. 15(b), the throughput when the OFDM scheme (multicast transmission scheme) using MLD is used is obviously higher than that when the DS-CDMA scheme (single cast transmission scheme) using SIC is used.

The operation of the above-described mobile station UE may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE. As a discrete component, such a storing medium and processor may be arranged in the mobile station UE.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile station configured to perform a MIMO (Multiple Input Multiple Output) communication, comprising:

a control unit configured to determine a radio access scheme to be applied, based on at least one of a transmission frequency bandwidth to be used and a transmission stream number used in the MIMO communication, wherein the control unit is configured to select the radio access scheme to be applied comprising a Multicarrier DFT-S-OFDM scheme and one OFDM scheme selected from a Clustered DFT-Spread OFDM scheme and a DFT-Spread OFDM scheme, and configured to determine a precoding vector to be used, for respective DFT units, the precoding vector being different between the respective DFT units, when the Multicarrier DFT-S-OFDM scheme is selected as the radio access scheme to be applied.

2. The mobile station according to claim 1, wherein the control unit is configured to determine a configuration of a reference signal to be transmitted, based on the radio access scheme to be applied.

3. The mobile station according to claim 1, wherein the control unit is configured to determine a precoding vector to be used, in cluster units, when the Clustered DFT-Spread OFDM scheme is selected as the radio access scheme to be applied.

* * * * *